United States Patent
Kim et al.

(10) Patent No.: US 10,161,461 B2
(45) Date of Patent: Dec. 25, 2018

(54) PAPER FRICTION MATERIAL AND METHOD OF MANUFACTURING THE SAME

(71) Applicants: Hyundai Motor Company, Seoul (KR); JINMYUNG FRICTECH CO., LTD., Incheon (KR)

(72) Inventors: Yoon Cheol Kim, Suwon-si (KR); Jai Min Han, Suwon-si (KR); Min Gyun Chung, Seongnam-si (KR); Jae Young Lee, Yongin-si (KR); Byung Chan Lee, Suwon-si (KR); Yoon Joo Rhee, Suwon-si (KR); Sung Jin Hong, Incheon (KR); Eun Pa Cho, Bucheon-si (KR); Chi Deuk Ahn, Anyang-si (KR)

(73) Assignees: Hyundai Motor Company, Seoul (KR); JINMYUNG FRICTECH CO., LTD., Incheon (KR)

( * ) Notice: Subject to any disclaimer, the term of this patent is extended or adjusted under 35 U.S.C. 154(b) by 0 days.

(21) Appl. No.: 15/364,694

(22) Filed: Nov. 30, 2016

(65) Prior Publication Data

US 2018/0058512 A1    Mar. 1, 2018

(30) Foreign Application Priority Data

Aug. 29, 2016    (KR) .......................... 10-2016-0110000

(51) Int. Cl.
| | | |
|---|---|---|
| *D21H 19/24* | (2006.01) | |
| *F16D 13/64* | (2006.01) | |
| *D21H 17/63* | (2006.01) | |
| *D21H 17/68* | (2006.01) | |
| *F16D 69/02* | (2006.01) | |

(52) U.S. Cl.
CPC ............ *F16D 13/64* (2013.01); *D21H 17/63* (2013.01); *D21H 17/68* (2013.01); *D21H 19/24* (2013.01); *F16D 69/02* (2013.01); *F16D 69/026* (2013.01); *F16D 2200/006* (2013.01); *F16D 2200/0034* (2013.01); *F16D 2200/0078* (2013.01); *F16D 2200/0086* (2013.01); *F16D 2200/0095* (2013.01); *F16D 2250/0046* (2013.01)

(58) Field of Classification Search
USPC .................................. 162/135, 141, 146, 165
See application file for complete search history.

(56) References Cited

U.S. PATENT DOCUMENTS 4,279,696 A  *  7/1981  Piersol ................... D21H 23/48
                                                                162/146

FOREIGN PATENT DOCUMENTS

| JP | 2002-542438 A | 12/2002 |
|---|---|---|
| JP | 2005-299840 A | 10/2005 |
| JP | 2007-100933 | 4/2007 |
| JP | 3948844 | 7/2007 |
| KR | 10-2009-0042465 | 4/2009 |
| KR | 10-2010-0055998 A | 5/2010 |

* cited by examiner

*Primary Examiner* — Mark Halpern
(74) *Attorney, Agent, or Firm* — Morgan, Lewis & Bockius LLP

(57) ABSTRACT

This invention relates to a paper friction material and a method of manufacturing the same, wherein the paper friction material is configured such that dispersibility and bondability are increased between a filler and a matrix. The paper friction material which is suitable for use in a vehicle, includes a friction base including pulp and a coating layer formed on the friction base using a mixture of latex and a functional material. The OH reactive group of the pulp and the aromatic ring of the latex are hydrogen-bonded so that the friction base and the coating layer are coupled with each other.

4 Claims, 2 Drawing Sheets

100

PAPER FRICTION MATERIAL AND METHOD OF MANUFACTURING THE SAME

CROSS REFERENCE TO RELATED APPLICATION

The present application claims under 35 U.S.C. § 119(a) the benefit of Korean Patent Application No. 10-2016-0110000, filed Aug. 29, 2016, the entire contents of which are incorporated herein by reference for all purposes.

BACKGROUND OF THE INVENTION

Field of the Invention

The present invention relates to a paper friction material and a method for the manufacture thereof. Provided herein is a paper friction material and a method of manufacturing the same in which the paper friction material is configured such that dispersibility and bondability are increased between a filler and a matrix.

Description of the Related Art

In order to be useful for an automatic transmission clutch, paper is required to have superior physical properties, including friction and wear properties, durability, impregnation porosity and the like. In particular, since an automatic transmission clutch operates in the state of being immersed in transmission oil, it has to possess superior high-temperature friction properties, wear resistance and durability even in the state of being impregnated with oil.

Examples of wet clutch materials that have been used to date include paper, sintered Cu or resin, graphite, etc. Paper is mainly used as a friction material for a vehicle. Paper is composed mainly of pulp and includes an inorganic filler and a thermosetting resin (e.g., phenol, epoxy, melamine resin). The kind and amount of inorganic filler are known to have an influence on the friction properties of paper.

Particularly, in order to increase NVH (Noise, Vibration, Harshness) reduction performance, as is required of an automatic transmission, the friction surface should be uniform, microsized particles for absorbing oil that is uniformly applied thereon. The microsized particles should be prevented from being separated from the friction material during usage.

To this end, a functional coating layer is conventionally formed on the surface of a friction material. The coating layer is formed by preparing a coating solution and applying the coating solution on the surface of the friction material. As such, applying the coating solution on the surface of the friction material may be performed using a bar-type coater or a wood or rubber roller. However, this coating process is problematic because it is difficult to apply the coating solution to a uniform thickness, and thus, the functional material and the filler, which are contained in the applied coating solution, are not uniformly distributed.

Details set forth as the background art are provided for the purpose of better understanding the background of the invention, but are not to be taken as an admission that the described details correspond to the conventional technology already known to those skilled in the art.

SUMMARY OF THE INVENTION

Accordingly, the present invention has been made keeping in mind the above problems encountered in the related art, and the present invention is intended to provide a paper friction material and a method of manufacturing the same, wherein functional fine particles are uniformly applied on the surface of a friction material and adhesion is enhanced so that the functional particles are prevented from being separated from the surface of the friction material during usage of the friction material.

An embodiment of the present invention provides a paper friction material for a vehicle, comprising: a friction base including pulp, and a coating layer formed by applying a mixture comprising latex and a functional material on the friction base, wherein an OH reactive group of the pulp and an aromatic ring of the latex are hydrogen-bonded so that the friction base and the coating layer are coupled with each other.

The friction base may include from about 35 wt % to about 45 wt % (e.g., about 35 wt %, 36, 37, 38, 39, 40, 41, 42, 43, 44, or about 45 wt %) of a matrix including pulp, from about 5 wt % to about 15 wt % (e.g., about 5 wt %, 6, 7, 8, 9, 10, 11, 12, 13, 14, or about 15 wt %) of a reinforcement, from about 15 wt % to about 25 wt % (e.g., about 15 wt %, 16, 17, 18, 19, 20, 21, 22, 23, 24, or about 25 wt %) of a friction modifier, and the remainder of a filler.

The reinforcement may include an aramid fiber, the friction modifier may include coke, and the filler may include at least one of diatomite and silicon nitride.

The coating layer may be formed through spray coating using a coating solution comprising the latex and the functional material, which are mixed.

The coating solution may include from about 50 wt % to about 60 wt % (e.g., about 50 wt %, 51, 52, 53, 54, 55, 56, 57, 58, 59, or about 60 wt %) of water, from about 22 wt % to about 28 wt % (e.g., about 22 wt %, 23, 24, 25, 26, 27, or about 28 wt %) of the latex, from about 15 wt % to about 25 wt % (e.g., about 15 wt %, 16, 17, 18, 19, 20, 21, 22, 23, 24, or about 25 wt %) of a filler, and about 8 wt % or less (e.g., about 8 wt %, 7, 6, 5, 4, 3, about 2 wt % or less) of the functional material.

The filler may include diatomite and the functional material may include at least one of graphite and molybdenum sulfide ($MoS_2$).

Another embodiment of the present invention provides a method of manufacturing a paper friction material for a vehicle, comprising: preparing a friction base including pulp, preparing a coating solution comprising latex and a functional material, which are mixed, coating the friction base with the coating solution using a spray, thus forming, on the surface of the friction base, a coating layer configured such that an OH reactive group of the pulp of the friction base and an aromatic ring of the latex of the coating solution are hydrogen-bonded, and drying the friction base having the coating layer formed thereon.

In this method, preparing the friction base may include: mixing from about 35 wt % to about 45 wt % (e.g., about 35 wt %, 36, 37, 38, 39, 40, 41, 42, 43, 44, or 45 wt %) of a matrix including pulp, from about 5 wt % to about 15 wt % (e.g., about 5 wt %, 6, 7, 8, 9, 10, 11, 12, 13, 14, or about 15 wt %) of a reinforcement, from about 15 wt % to about 25 wt % (e.g., about 15 wt %, 16, 17, 18, 19, 20, 21, 22, 23, 24, or about 25 wt %) of a friction modifier, and the remainder of a filler to give a mixture which is then subjected to dehydration pressing to form a sheet, thus manufacturing a friction base, and drying the friction base.

Also, preparing the coating solution may include mixing from about 50 wt % to about 60 wt % (e.g., about 50 wt %, 51, 52, 53, 54, 55, 56, 57, 58, 59, or about 60 wt %) of water, from about 22 wt % to about 28 wt % (e.g., about 22 wt %, 23, 24, 25, 26, 27, or about 28 wt %) of the latex, from about 15 wt % to about 25 wt % (e.g., about 15 wt %, 16, 17, 18, 19, 20, 21, 22, 23, 24, or about 25 wt %) of a filler and from about 8 wt % or less (e.g., about 8 wt %, 7, 6, 5, 4, 3, about 2 wt % or less) of the functional material.

Also, preparing the coating solution may include: (1) mixing the water with the filler and the functional material, thus obtaining a coating solution, (2) stirring the resulting coating solution, (3) mixing the stirred coating solution with the latex, and (4) stirring the resulting mixed coating solution.

The method may further include impregnating the friction base with a phenol resin, squeezing the friction base impregnated with the phenol resin, and performing heat treatment for hardening the phenol resin incorporated into the friction base. After the drying, the friction base has the coating layer formed thereon.

According to embodiments of the present invention, a coating layer can be uniformly formed on the surface of a friction material through a spray-coating process using a coating solution comprising latex and functional particles, thereby increasing the NVH reduction performance of the friction material.

Since the coating layer is formed using latex, adhesion of the coating layer is enhanced, whereby the functional particles can be prevented from being separated from the friction material during usage of the friction material.

BRIEF DESCRIPTION OF THE DRAWINGS

The above and other features and advantages of the present invention will be more clearly understood from the following detailed description taken in conjunction with the accompanying drawings.

DESCRIPTION OF SPECIFIC EMBODIMENTS

Figure 1:
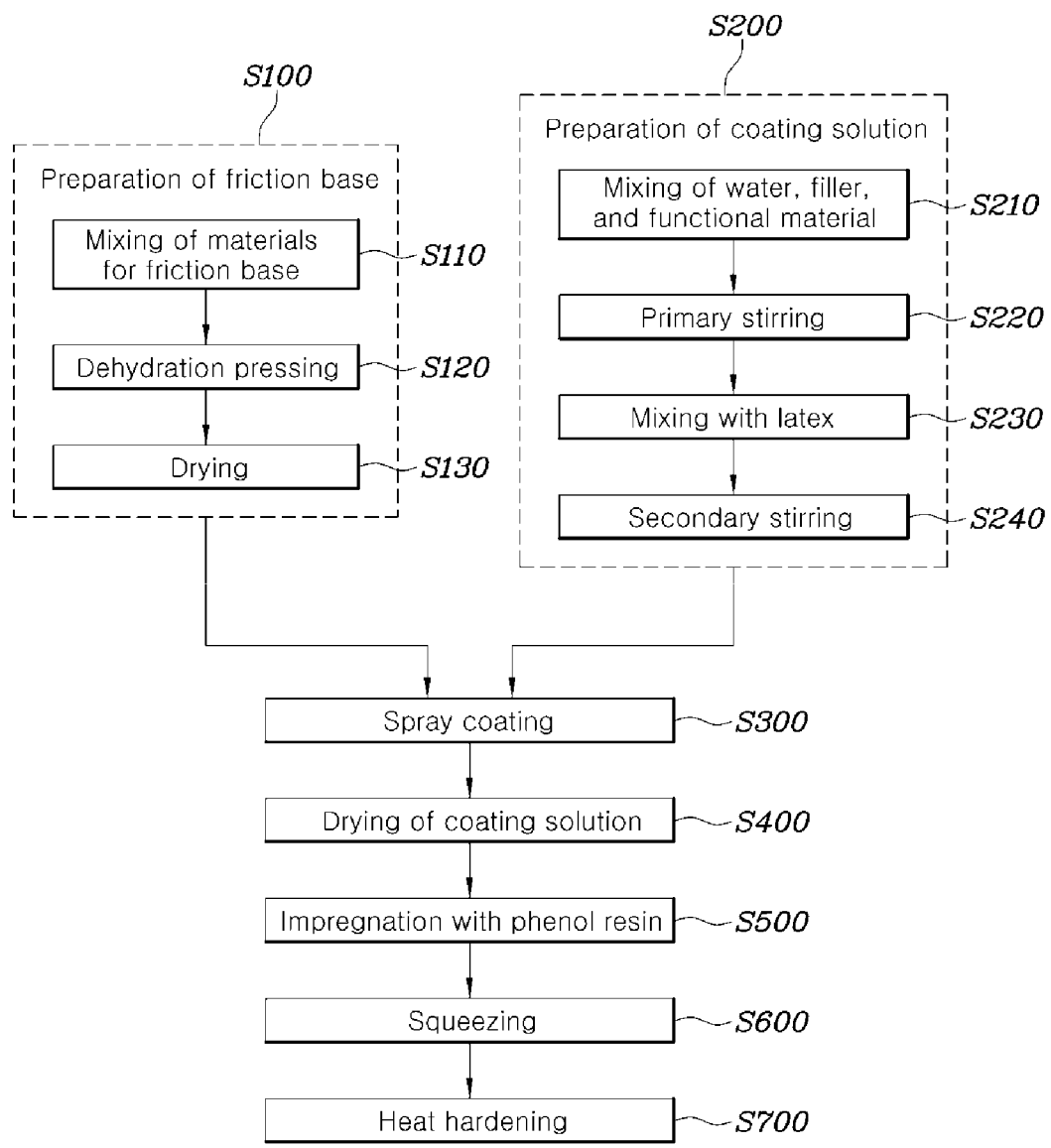
FIG. 1 is a flowchart showing a process of manufacturing a paper friction material according to an embodiment of the present invention.

Hereinafter, a detailed description will be given of embodiments of the present invention with reference to the appended drawings. However, the present invention is not limited to the following embodiments, which may be changed to have various forms. These embodiments are provided to complete the disclosure of the present invention and to fully describe the present invention to those skilled in the art.

According to an embodiment of the present invention, a paper friction material (hereinafter, referred to as a "friction material") includes a friction base including pulp and a coating layer formed by applying a mixture comprising latex and a functional material on the friction base. As such, the OH reactive group of the pulp and the aromatic ring of the latex are hydrogen-bonded, whereby the friction base and the coating layer are coupled with each other.

The friction base constitutes most of the paper friction material in order to obtain the desired compression resistance, mechanical strength and heat resistance. The friction base can be in an amount of about 95 wt % based on the total weight of the paper friction material.

The friction base can be composed of, based on wt % (hereinafter, % indicates wt % unless otherwise stated), from about 35% to about 45% (e.g., about 35 wt %, 36, 37, 38, 39, 40, 41, 42, 43, 44, or about 45 wt %) of a matrix including pulp, from about 5% to about 15% (e.g., about 5 wt %, 6, 7, 8, 9, 10, 11, 12, 13, 14, or about 15 wt %) of a reinforcement, from about 15% to 25% (e.g., about 15 wt %, 16, 17, 18, 19, 20, 21, 22, 23, 24, or about 25 wt %) of a friction modifier, and the remainder of a filler.

The matrix, which constitutes the friction base, is a helical-type linter pulp. The helical-type linter pulp is characterized by softness and thus frictional noise is reduced. The bonding angle or internal rotation angle within the molecular chain is somewhat consistently formed, whereby high resistance to continuous fatigue and high resilience may result. Also, oil, which is absorbed into and stored in the friction material, may be instantly released like a sponge, and thus heat generated upon slipping is rapidly dissipated and the durability of the friction material may increase.

Linter pulp is used as the matrix of the friction base such that a hydrogen bonding layer may be formed using the O—H pulp structure contained in the linter pulp.

The matrix is preferably used in an amount of about 35 to 45% (e.g., about 35%, 36, 37, 38, 39, 40, 41, 42, 43, 44, or about 45%) in order to maintain the aforementioned physical properties.

The reinforcement is added to impart tensile strength, toughness, heat resistance and elastic modulus to the friction material. The reinforcement may be composed of various components depending on end use of the friction material. The amount of the reinforcement is limited to a range of about 5% to 15% (e.g., about 5 wt %, 6, 7, 8, 9, 10, 11, 12, 13, 14, or about 15 wt %). Hence, the physical properties that are anticipated in the friction base due to the addition of the reinforcement may be retained, and furthermore, the physical properties that are anticipated from the inclusion of the reinforcement may be maintained.

In this embodiment, a reinforced fiber, for example, an aramid fiber, can be used as the reinforcement. Thus, high tensile strength, toughness, heat resistance and elastic modulus are imparted to the friction material, and frictional noise may be reduced due to the property of softness.

The friction modifier can be added to increase the friction properties of the friction material. In the present embodiment, coke is used.

The amount of the friction modifier is limited to a range of about 15% to 25% (e.g., about 15 wt %, 16, 17, 18, 19, 20, 21, 22, 23, 24, or about 25 wt %). And thus noise and vibration of the friction material are preferably reduced to a desired level by the addition of the friction modifier.

The friction base is composed of the matrix, the reinforcement and the friction modifier, which are mixed in desired amounts, with the remainder of the filler. The filler, which is used in the remaining amount, can be made of a porous material to minimize inter-surface slipping and achieve complete contact. The filler preferably includes at least one of diatomite and silicon nitride. Diatomite and silicon nitride have pores and a particle size on a micron scale. When pores for absorbing oil are distributed throughout the matrix, an oil lubricant film may be favorably formed. When diatomite and silicon nitride are used as the filler, noise and vibration reduction performance may be increased.

The coating layer is formed on the surface of the friction base. The coating solution comprising latex and a functional material, which are mixed together, can be applied through spray coating.

In some embodiments, the coating solution is composed of about 50% to about 60% (e.g., about 50 wt %, 51, 52, 53, 54, 55, 56, 57, 58, 59, or about 60 wt %) of water, about 22% to about 28% (e.g., about 22 wt %, 23, 24, 25, 26, 27, or about 28 wt %) of latex, about 15% to about 25% (e.g., about 15 wt %, 16, 17, 18, 19, 20, 21, 22, 23, 24, or about 25 wt %) of a filler, and about 8% or less (e.g., about 8 wt %, 7, 6, 5, 4, 3, 2, 1 wt % or less) of a functional material. The filler can include diatomite, and the functional material preferably includes at least one of graphite and molybdenum sulfide ($MoS_2$).

If the amount of water is less than 50%, the coating nozzle may clog in the spray-coating process and the coating process may be non-uniformly performed. On the other hand, if the amount of water exceeds 60%, bondability may decrease and the surface adsorbability of the friction material may become problematic.

The latex is used to firmly attach the filler and the functional material to the surface of the friction base. A strong bond is maintained because of the bonding of the latex alone as well as the hydrogen bonding between the OH reactive group of the linter pulp and the aromatic ring of the latex can increase bonding energy. Thus, these interactions can provide the bonding strength of a monolayer structure between the friction base and the coating layer.

If the amount of latex is less than 22%, the filler and the functional material are not sufficiently bonded to the surface of the friction material by the components of the latex, and thus, in the squeezing process after the impregnation, the filler and the functional material may be stripped off. On the other hand, if the amount thereof exceeds 28%, the pores of the filler and the friction material may be clogged and oil flow may decrease, undesirably causing noise problems.

When the amount of diatomite used as the filler is 15% or more, it is uniformly distributed on the corresponding surface to thus exhibit superior noise-reduction performance. If the amount thereof exceeds 25%, mineral particles are excessively sprayed in the spray-coating process, undesirably causing reliability problems.

As the functional material, graphite and molybdenum sulfide ($MoS_2$) are solid lubricants, and the amount thereof is preferably limited to 8% or less in order to improve lubricating properties.

A method of manufacturing the paper friction material is described below with reference to the appended drawing.

FIG. 1 is a flowchart showing the process of manufacturing the paper friction material according to an embodiment of the present invention.

As shown in FIG. 1, the method of manufacturing the paper friction material according to an embodiment of the present invention includes preparing a friction base (S100), preparing a coating solution (S200), forming a coating layer (S300), drying the friction base (S400), impregnating the friction base with a phenol resin (S500), squeezing the friction base (S600), and performing heat treatment (S700).

When preparing the friction base (S100), the friction base is provided in the form of a single layer.

The friction base is prepared by combining a matrix, a reinforcement, a friction modifier and a filler in the aforementioned amounts and then mixing the resulting combination with water using a mixer so as to achieve uniform distribution (S110).

The mixture thus obtained is placed in a sheet former and then dehydration-pressed, whereby the mixture is uniformly left behind on the wire mesh of the sheet former (S120). The dehydration press is operated at 2500 to 3000 psi for 8 to 12 sec so that up to approximately 90% of the water is removed.

Next, the mixture in sheet form is separated from the wire mesh and then dried at from about 140° C. to 160° C. (e.g., about 140° C., 141, 142, 143, 144, 145, 146, 147, 148, 149, 150, 151, 152, 153, 154, 155, 156, 157, 158, 159, or 160° C.) for about 8 to 12 min (e.g., about 8 min, 9, 10, 11, or 12 min), thus preparing a friction base (S130). The friction base thus prepared has a water content of less than 5%.

After preparation of the friction base, a coating solution, which is to be applied on the friction base, is prepared (S200).

The coating solution is prepared by mixing water, latex, a filler and a functional material in the aforementioned amounts and then stirring them. As such, preparing the coating solution is performed through multiple procedures so that other materials are prevented from coagulating due to the aggregation force of latex to thus prevent the clogging of the nozzle of a spray gun in the spray-coating process.

Specifically, water is mixed with a filler and a functional material in predetermined amounts (primary mixing; S210). Next, the coating solution obtained in the primary mixing process is sufficiently stirred (primary stirring; S220).

When water is sufficiently mixed with the filler and the functional material in this way, the coating solution, which is primarily stirred, is mixed with latex in a predetermined amount (secondary mixing; S230). Next, the secondarily mixed coating solution is sufficiently stirred to prepare a coating solution (secondary stirring; S240).

When the friction base and the coating solution are prepared in this way, the coating solution is applied on the friction base using a spray (S300). The coating solution is sprayed on the friction base, whereby a coating layer is formed on the surface of the friction base while the OH reactive group of the linter pulp of the friction base and the aromatic ring of the latex of the coating solution are hydrogen-bonded.

After spray coating with the coating solution, water and latex, acting as the binder in the coating solution, are dried to increase the bondability of the coating layer formed on the surface of the friction base (S400). Here, the loss of the coating solution is prevented using a non-contact dryer such as a hot air dryer, instead of a contact-type dryer.

After formation of the coating layer on the surface of the friction base, the friction base having the coating layer formed thereon is impregnated with a phenol resin to increase the tensile strength and shear strength of the friction material and improve heat resistance and wear resistance (S500).

When the friction base having the coating layer formed thereon is sufficiently impregnated with the phenol resin, the phenol resin-impregnated friction base is squeezed by passing it through rolls at a predetermined interval, so that the phenol resin is uniformly distributed in the friction base having the coating layer formed thereon (S600).

After squeezing, heat treatment is performed to harden the phenol resin incorporated into the friction base, thereby completing the fabrication of the friction material (S700). Here, heat treatment is performed at about 170° C. to about 180° C. (e.g., about 170° C., 171, 172, 173, 174, 175, 176, 177, 178, 179, or about 180° C.) for about 3 to about 5 min (e.g., about 3 min, 4 min, or about 5 min).

Below, the present invention is described through the following Comparative Example and Example.

In the following tests, the Example of the present invention is a friction material (comprising two layers) configured such that a coating layer is formed on a friction base using a spray-coating process, and Comparative Example is a friction material (comprising one layer) having no coating layer.

Figure 2:
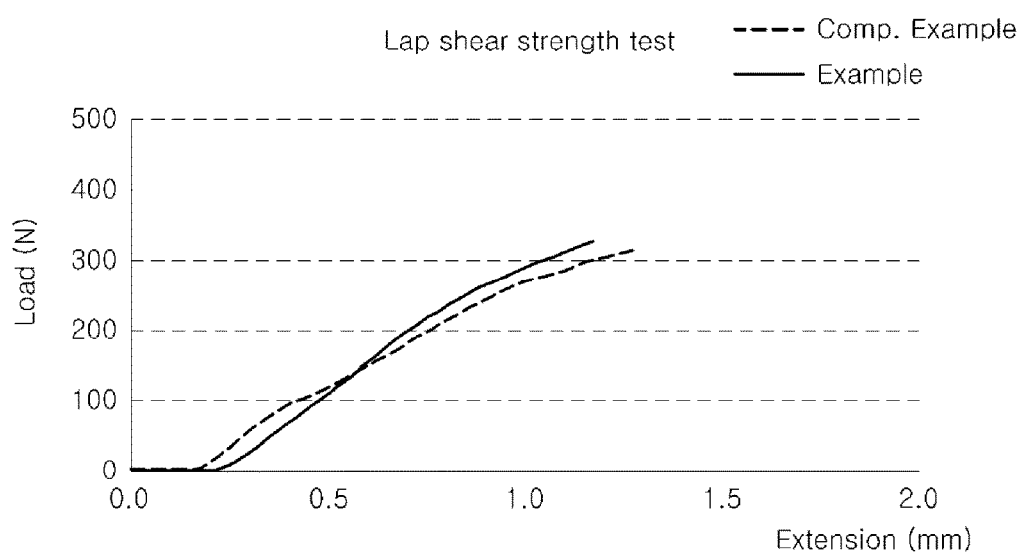
FIG. 2 is a graph showing the results of shear strength of Comparative Example and Example according to the present invention.

Testing for measuring shear strength was performed. The results are shown in FIG. 2. Shear strength in Comparative Example and Example was measured according to ASTM D1002 (Lap shear strength test).

FIG. 2 is a graph showing the results of shear strength of Example of the present invention and Comparative Example.

As shown in FIG. 2, in the case of Example, internal bonding strength equal to or greater than that of Comparative Example was exhibited due to the complete bonding of the latex binder.

In addition, the friction stability of the friction materials of Comparative Example (Comparative Example 1) and Example was measured. The results are shown in Table 1 below.

To evaluate noise and vibration properties, tests were performed using an international standards-compliant LVFA, and friction stability was evaluated based on the obtained dµ/dv values. Here, dµ/dv is the slope of coefficient of friction relative to speed. When dµ/dv has a positive (+) value, stick-slip does not occur and noise and vibration are significantly reduced. On the other hand, when dµ/dv has a negative (−) value, the likelihood of generating stick-slip, which causes vibration, may increase, and thus noise and vibration are not reduced. That is, when the dµ/dv value is greater than 0, noise and vibration may be more favorably reduced.

TABLE 1

| Test | | Comp. Example 1 | | Example | |
|---|---|---|---|---|---|
| | | dµ/dv (50 to 100 km) | dµ/dv (100 to 50 km) | dµ/dv (50 to 100 km) | dµ/dv (100 to 50 km) |
| LVFA test (0 hr) | 40° C. | 2.0 | 0.5 | 9.9 | 1.2 |
| | 80° C. | −2.7 | −2.7 | 10.6 | 4.4 |
| | 120° C. | −6.7 | −3.0 | 19.4 | 14.8 |
| LVFA test (24 hr) | 40° C. | — | — | 9.8 | 6.4 |
| | 80° C. | — | — | 9.0 | 2.5 |
| | 120° C. | — | — | 11.8 | 3.8 |
| LVFA test (48 hr) | 40° C. | — | — | 11.4 | 5.9 |
| | 80° C. | — | — | 13.5 | 6.2 |
| | 120° C. | — | — | 18.0 | 6.3 |

As is apparent from the results of Table 1, the dµ/dv value of Example had a positive value, unlike Comparative Example 1, thus ensuring friction stability.

Also, in order to evaluate the effects of latex used for the coating solution, the friction stability of the friction materials of Example of the present invention and Comparative Example 2 using a phenol resin instead of the latex of the coating solution was evaluated. The results are shown in Table 2 below.

TABLE 2

| Test | | Comp. Example 2 | | Example | |
|---|---|---|---|---|---|
| | | dµ/dv (50 to 100 km) | dµ/dv (100 to 50 km) | dµ/dv (50 to 100 km) | dµ/dv (100 to 50 km) |
| LVFA test (0 hr) | 40° C. | −2.2 | −3.7 | 9.9 | 1.2 |
| | 80° C. | −1.9 | −2.9 | 10.6 | 4.4 |
| | 120° C. | −9.6 | −4.1 | 19.4 | 14.8 |
| LVFA test (24 hr) | 40° C. | — | — | 9.8 | 6.4 |
| | 80° C. | — | — | 9.0 | 2.5 |
| | 120° C. | — | — | 11.8 | 3.8 |
| LVFA test (48 hr) | 40° C. | — | — | 11.4 | 5.9 |
| | 80° C. | — | — | 13.5 | 6.2 |
| | 120° C. | — | — | 18.0 | 6.3 |

As is apparent from Table 2, the dµ/dv value of Example had a positive value, unlike Comparative Example 2, thus ensuring friction stability.

When the phenol resin was used, stability with the filler was decreased and thus the filler was not uniformly applied upon spray coating. Due to this problem, the friction surface is not relatively uniform, and the oil film is not uniformly formed upon a continuous slip test, thus deteriorating NVH reduction performance.

Although the preferred embodiments of the present invention have been disclosed for illustrative purposes with reference to the appended drawings, those skilled in the art will appreciate that various modifications, additions and substitutions are possible, without departing from the scope and spirit of the invention as disclosed in the accompanying claims.

What is claimed is:

1. A paper friction material for a vehicle, comprising:
a friction base including pulp; and
a coating layer formed by applying a mixture comprising latex and a functional material on the friction base,
wherein an OH reactive group of the pulp and an aromatic ring of the latex are hydrogen-bonded so that the friction base and the coating layer are coupled with each other,
wherein the friction base comprises from about 35 wt % to about 45 wt % of a matrix including the pulp, from about 5 wt % to about 15 wt % of a reinforcement, from about 15 wt % to about 25 wt % of a friction modifier, and a remainder of a filler,
wherein the functional material includes at least one of graphite and molybdenum sulfide ($MoS_2$), and
wherein the reinforcement comprises an aramid fiber, the friction modifier comprises coke, and the filler comprises at least one of diatomite and silicon nitride.

2. The paper friction material of claim 1, wherein the coating layer is formed through spray coating using a coating solution comprising the latex and the functional material, which are mixed.

3. The paper friction material of claim 2, wherein the coating solution comprises from about 50 wt % to about 60 wt % of water, from about 22 wt % to about 28 wt % of the latex, from about 15 wt % to about 25 wt % of a filler, and from about 8 wt % or less of the functional material.

4. The paper friction material of claim 3, wherein the filler comprises diatomite.

* * * * *